United States Patent
Elcock

(10) Patent No.: US 8,161,154 B2
(45) Date of Patent: Apr. 17, 2012

(54) ESTABLISHING A THIN CLIENT TERMINAL SERVICES SESSION

(75) Inventor: David Elcock, Stockport (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 322 days.

(21) Appl. No.: 12/241,435

(22) Filed: Sep. 30, 2008

(65) Prior Publication Data

US 2010/0082734 A1   Apr. 1, 2010

Related U.S. Application Data

(60) Provisional application No. 61/005,370, filed on Dec. 4, 2007.

(51) Int. Cl.
*G06F 15/173* (2006.01)

(52) U.S. Cl. ........................................................ 709/225

(58) Field of Classification Search .................. 709/225
See application file for complete search history.

(56) References Cited

U.S. PATENT DOCUMENTS

| | | |
|---|---|---|
| 5,944,824 A | 8/1999 | He |
| 6,085,247 A | 7/2000 | Parsons, Jr. et al. |
| 6,243,816 B1 | 6/2001 | Fang et al. |
| 6,519,643 B1 | 2/2003 | Foulkes et al. |
| 7,188,360 B2 | 3/2007 | Gerdes et al. |
| 7,194,764 B2 | 3/2007 | Martherus et al. |
| 7,207,058 B2 | 4/2007 | Barrett |
| 7,231,661 B1 | 6/2007 | Villavicencio et al. |
| 2003/0198348 A1* | 10/2003 | Mont et al. .................... 380/277 |
| 2004/0111644 A1 | 6/2004 | Saunders et al. |
| 2004/0210771 A1* | 10/2004 | Wood et al. ................... 713/201 |
| 2005/0193259 A1* | 9/2005 | Martinez et al. ................ 714/34 |
| 2006/0206926 A1 | 9/2006 | Luo et al. |
| 2007/0008973 A1* | 1/2007 | Galea ............................ 370/392 |
| 2007/0162963 A1 | 7/2007 | Penet et al. |

* cited by examiner

*Primary Examiner* — Kenny Lin
*Assistant Examiner* — Farhad Ali

(57) ABSTRACT

An encrypted credential is received from a client terminal, where the encrypted credential is based on encryption of an authentication credential input by a user at the client terminal for allocating resources from a central server, the resources to provide a thin client terminal services session. A thin client terminal services session is established between the client terminal and the central server using the allocated resources, where establishing the thin client terminal services session include receiving a decryption key from a remote system, and decrypting the encrypted credential using the decryption key.

21 Claims, 2 Drawing Sheets

ESTABLISHING A THIN CLIENT TERMINAL SERVICES SESSION

BACKGROUND

Some enterprises provide thin client terminal services at a central server (or group of servers) to allow remote client terminals to access applications, data, and other software deployed at the central server(s). Terminal services allow an administrator to install, configure, and manage applications and user environments centrally on one or a few central servers. Deploying applications and user environments on a single central server (or group of servers) is usually much easier to implement than deploying applications and user environments on hundreds or even thousands of desktop or portable machines at different sites across an enterprise. As a result, cost savings can be achieved due to reduced information technology (IT) support costs.

A further feature of providing terminal services at one or a group of central servers is that resource requirements (e.g., processing and/or storage requirements) for client terminals are reduced. As a result, thin clients can be used, where a thin client refers to a user terminal or station that depends on a central server for processing activities. Therefore, the enterprise can save money by using older client terminals that may otherwise be obsolete.

To access a terminal service, a user at a client terminal usually has to submit the user's logon identity and password, such that resources can be allocated for establishing a terminal services session. In some conventional systems, after allocation of the logon identity and password, the user may again be prompted for logon credentials when the client terminal attempts to establish a connection to the allocated resources.

The double credential prompt is usually irritating for users and adds to delay in establishing a terminal services session.

BRIEF DESCRIPTION OF THE DRAWINGS

Some embodiments of the invention are described, by way of example, with respect to the following figures.

DETAILED DESCRIPTION

In accordance with some embodiments, a technique or mechanism for establishing a thin client terminal services session between a client terminal and a terminal server (or central server) avoids prompting a user for authentication credentials multiple times. A "thin client terminal services session" or "terminal services session" refers to a session established between a client terminal and a server in which resources (including one or more software applications, computing resources such as processing resources and storage resources, user personalized environment, etc.) of the server are allocated to the client terminal. The client terminal can be a thin client having a reduced amount of processing and storage resources when compared to full-featured client terminals. Since resources are centralized at the server, and such resources can be allocated to a terminal services session, the user at the client terminal can still be provided with a relatively high-level desktop experience even though the user is using a thin client.

In a terminal services session, a user interface (e.g., graphical user interface, or GUI, having one or more GUI screens and control items) is presented at the client terminal. However, any input received at the user interface is redirected over a network from the client terminal to the server, which performs the processing based on the user input.

Terminal services can be provided by some WINDOWS® operating systems from Microsoft Corporation. Alternatively, terminal services can also be provided by the consolidated client infrastructure (CCI) from the Hewlett-Packard Co., where CCI is a desktop-replacement solution that enables end users to access their personalized environments, applications, and data from remote client terminals, with the same high-level desktop experience.

Figure 1:
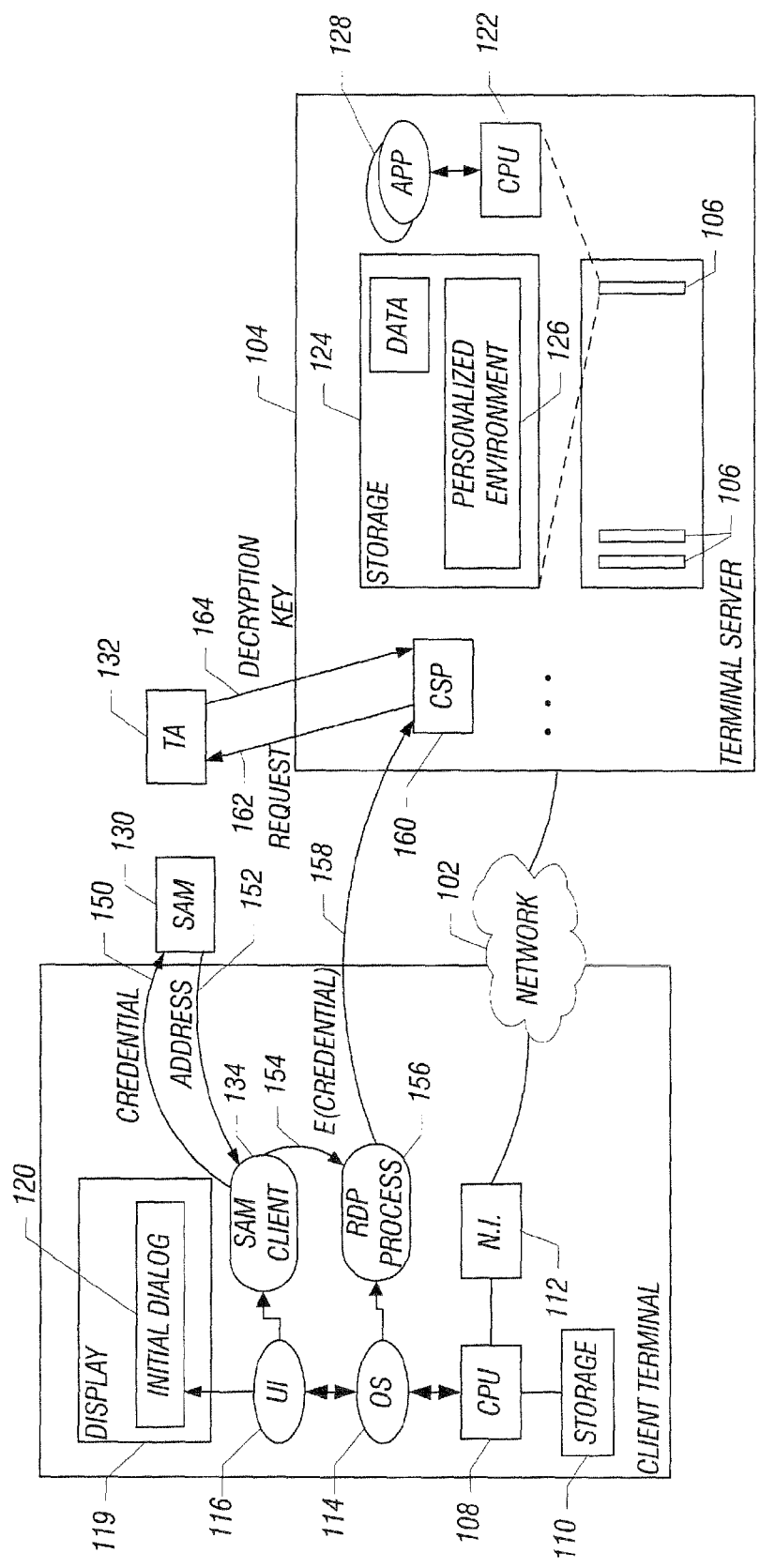
FIG. 1 is a block diagram of an example arrangement of a system in which a thin client terminal services session can be established according to some embodiments.

FIG. 1 shows an example arrangement that includes a client terminal 100 that is coupled over a network 102 to a terminal server 104. The terminal server 104, in the example of FIG. 1, can include multiple blade servers 106 mounted in corresponding slots of the terminal server 104. Alternatively, the terminal server 104 can have other arrangements. Although just one terminal server 104 is depicted, other implementations can have additional terminal servers 104. Also, there usually is a relatively large number of client terminals.

The client terminal 100 has a central processing unit (CPU) 108 that is connected to a storage 110 and a network interface 112. The network interface 112 allows the client terminal 100 to communicate over the data network 102 with the terminal server 104.

In addition, an operating system 114 is provided in the client terminal 100. A user interface module 116 is also provided in the client terminal 100, where the user interface module 116 is able to present an initial dialog 120 (such as in a display device 119 of the client terminal 100) to prompt for authentication credentials (e.g., identity and password) of a user. The user interface module 116 can also present other dialogs or GUI screens to accept other user input.

Each blade server 106 in the terminal server 104 can include one or more CPUs 122. The one or more CPUs 122 are coupled to a corresponding storage 124. The storage 124 can store data that can be accessed by the client terminal 100. Note that each blade server 106 can include a corresponding storage 124. The storage 124 also stores personalized environment information 126 accessible by a client terminal to set up a personalized environment at the client terminal. A "personalized environment" refers to the desktop environment presented at the client terminal according to a particular user's settings and preferences. The desktop environment can include icons, windows, toolbars, and so forth, which are according to the user's settings and preferences. Different users can have different personalized environment information associated with different settings.

The terminal server 104 also includes software applications 128, which are executable on the CPUs 122 in the blade servers 106. The software applications 128 are accessible by the client terminal 100. Note that when accessed by a client terminal 100, a software application 128 can present a user interface in the client terminal 100. However, the application 128 remains in the terminal server 104, and executes in the terminal server 104.

Also depicted in FIG. 1 is a session allocation manager (SAM) 130 and a trust authority system 132. The session allocation manager 130 is used to allocate resources of the terminal server 104 to a particular client terminal 100. Although the session allocation manager 130 is depicted as being separate from the terminal server 104, note that the session allocation manager 130 can be part of the terminal server 104.

The trust authority system 132 is able to provide decryption keys to the terminal server 104 to allow the terminal server 104 to decrypt encrypted user credentials so that a terminal services sessions can be established between a client terminal 100 and the terminal server 104.

FIG. 1 also shows various message flows to enable the establishment of a terminal services session. Initially, a session allocation manager (SAM) client module 134 that is executable in the client terminal 100 can be invoked to cause the user interface module 116 to present the initial dialog 120 to a user to collect a user authentication credential. The SAM client module 134 can be invoked in response to a user request (such as clicking of a menu control item, a hyperlink, etc.) that indicates the user's desire to establish a terminal services session with the terminal server 104.

Note that the SAM client module 134 can be web-based module that is downloadable from a server, such as the terminal server 104 or another server, to the client terminal 100 for the purpose of establishing a terminal services session.

When the user enters the user's authentication credential, such as a user identity and password, the authentication credential is communicated (at 150) to the session allocation manager 130. The session allocation manager 130 then validates the authentication credential based on rights and policies information stored by the session allocation manager 130. If the session allocation manager 130 is able to validate the authentication credential, the session allocation manager 130 returns (at 152) an address of a computing resource of the terminal server 104. This address is used by the client terminal 100 to establish a login session with the terminal server 104 for establishing a terminal services session.

The authentication credential collected from the user at the client terminal 100 can be hashed by applying the authentication credential to a hashing algorithm. The hashing algorithm (which can be a cryptographic hash function) converts the authentication credential into a different value. The hashed credential can then be encrypted using some encryption algorithm. In a different implementation, hashing is not performed prior to applying encryption.

In one example, the encryption used is identity-based encryption (IBE), in which the encryption key is derived from the identity of a user, for example. The hashed credential is encrypted using the IBE encryption key in one example to produce an IBE packet, which includes the derived encryption key.

In accordance with some embodiments, the decryption key for decrypting the encrypted credential is valid for some predetermined short time duration. The time duration can be configurable by an administrator.

Encryption of a credential refers to any one of the following: encryption of just a password (with the identity not being encrypted), encryption of both the password and user identity, or encryption of some other credential of the user.

The SAM client module 134 spawns (at 154) a process 156 for establishing a terminal services session with the terminal server 104. In one embodiment, the process 156 can be remote desktop (RDP) process that is able to establish an RDP connection with the terminal server 104 for the purpose of establishing a terminal services session. More generally, the RDP connection is one example of a login session that the client terminal 100 can establish with the terminal server 104. The login session is established with the address of the computing resource returned by the session allocation manager 130 at 152.

The SAM client module 134 passes the encrypted credential (e.g., an IBE packet) to the RDP process 156. The IBE packet can include string data (which is the encrypted credential) with an identifying leading tag to identify the packet as an encryption packet. Once the RDP connection is established, the IBE packet is submitted (at 158) as the authentication credential to the terminal server 104.

Note that the information communicated at 158 from the RDP process 156 to the terminal server 104 can include an unencrypted user identity and encrypted password, in the implementation where the password is encrypted but the identity is not. Alternately, the encrypted credential communicated at 158 can be an encrypted version of both the identity and password.

The encrypted authentication credential from the RDP process 156 can be received by a cryptographic service provider 160 in the terminal server 104. The cryptographic service provider 160 is used for decrypting the received encrypted authentication credential and to validate the decrypted authentication credential. The cryptographic service provider 160, upon recognizing the tagged encrypted authentication credential, requests (at 162) a decryption key from the trust authority system 132. In response to the request, the trust authority system 132 sends (at 164) the decryption key to the cryptographic service provider 160. The trust authority system 132 validates the cryptographic service provider 160 as an authorized entity to receive a decryption key. As noted above, the decryption key is valid for some predetermined time duration. The trust authority 132 also checks to ensure that the time duration has not expired. If policy is satisfied, the decryption key is returned at 164 to the cryptographic service provider 160. The cryptographic service provider 160 uses the decryption key received at 164 to decrypt the encrypted authentication credential received at 158. The cryptographic service provider 160 then decrypts the received encrypted authentication credential, processes the decrypted authentication credential, and upon successful validation, the login session completes and the terminal services session is established between the client terminal 100 and terminal server 104.

Figure 2:
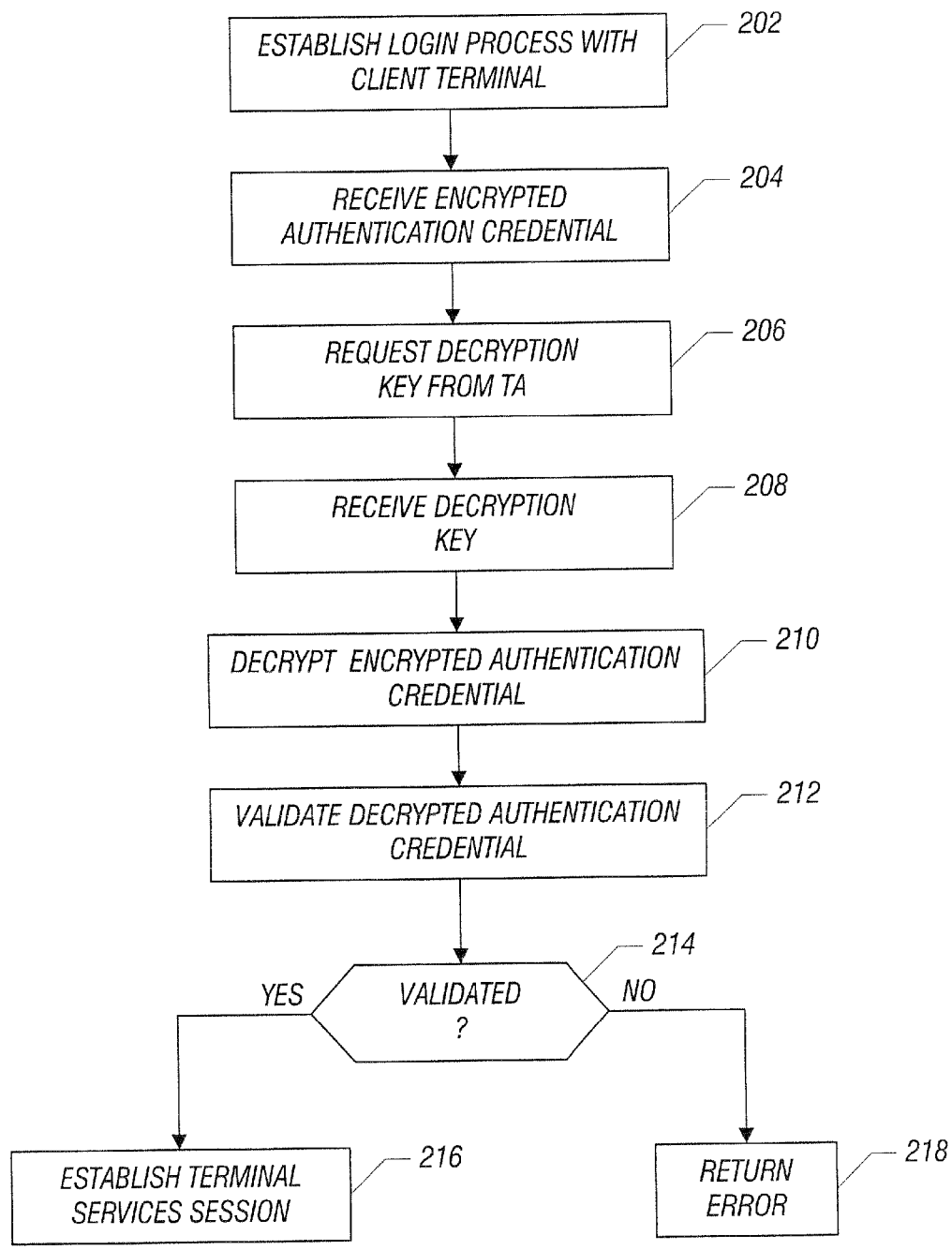
FIG. 2 is a flow diagram of a process according to an embodiment.

FIG. 2 shows a procedure performed by the terminal server 104 according to an embodiment. As noted above, a login process is established (at 202) between the terminal server 104 and the RDP process 156 in the client terminal. Next, the terminal server 104 receives (at 204) the encrypted authentication credential in the login process (sent at 158 in FIG. 1). The receiving can be performed by the cryptographic service provider 160 of FIG. 1.

In response to detecting the encrypted authentication credential, the cryptographic service provider 160 transmits (at 206) a request for a decryption key from the trust authority system. The request sent to the trust authority system can include the derived encryption key as well as constraints, such as time limits placed on the decryption key. The trust authority system checks the constraints to ensure that the decryption key is still valid (e.g., the time duration has not expired). In response to the request, the cryptographic service provider 160 receives (at 208) a decryption key from the trust authority system if the decryption key is still valid (in other words, a time duration associated with the decryption key has not expired). The decryption key is then used to decrypt (at 210) the encrypted authentication credential received at 204. The decrypted authentication credential is then validated (at 212) by the cryptographic service provider 160. If it is determined (at 214) that the authentication credential has been validated, then the terminal services session is established (at 216). However, if the decrypted authentication credential is not validated, then an error is returned (at 218).

By using techniques and mechanisms according to some embodiments, a more user-friendly approach is provided to users for establishing thin client terminal services sessions. User convenience is enhanced by allowing the user to enter the user's credential just once (instead of multiple times) to establish the terminal services session.

Instructions of software described above (including the SAM client 134, RDP process 156, and cryptographic service provider 160 of FIG. 1) are loaded for execution on a processor (such as one or more CPUs 108, 122 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more non-transitory computer-readable or computer-usable storage media. The non-transitory storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
   receiving an encrypted credential from a client terminal, wherein the encrypted credential is based on encryption of an authentication credential input by a user at the client terminal for allocating resources from a central server, the resources to provide a thin client terminal services session; and
   establishing the thin client terminal services session between the client terminal and the central server using the allocated resources, wherein establishing the thin client terminal services session comprises:
      in response to receiving the encrypted credential from the client terminal, requesting a decryption key from a remote system;
      receiving the decryption key from the remote system if the remote system confirmed that the decryption key is valid; and
      decrypting the encrypted credential using the decryption key if the decryption key is confirmed valid.

2. The method of claim 1, wherein receiving the decryption key from the remote system comprises, receiving the decryption key from a trust authority.

3. The method of claim 2, wherein receiving the decryption key comprises receiving the decryption key that is valid for a predetermined time period.

4. The method of claim 3, wherein receiving the decryption key from the trust authority comprises:
   receiving the decryption key from the trust authority if the trust authority confirmed that the predetermined time period has not expired and that the decryption key is valid.

5. The method of claim 1, wherein receiving the encrypted credential comprises receiving the encrypted credential that is according to encryption of the authentication credential according to identity based encryption.

6. The method of claim 1, further comprising providing services of a software application at the central server in the established thin client terminal services session, wherein the software application is executable on the central server instead of at the client terminal.

7. The method of claim 6, further comprising providing personalized environment information from the central server to the client terminal to establish a personalized desktop environment at the client terminal using the personalized environment information.

8. The method of claim 1, further comprising:
   receiving, at a session allocation manager, the authentication credential input by the user; and
   sending, from the session allocation manager, an address of an allocated resource of the central server in response to validating the authentication credential by the session allocation manager.

9. The method of claim 8, wherein establishing the thin client terminal service session further comprises:
   establishing a login process between the client terminal and the central server using the address,
   wherein receiving the encrypted credential from the client terminal is part of the login process.

10. The method of claim 9, wherein establishing the login process comprises establishing a remote desktop connection.

11. The method of claim 1, wherein allocating the resources from the central server comprises allocating the resources from a consolidated client infrastructure server.

12. The method of claim 1, wherein allocating the resources from the central server comprises allocating the resources from the central server that provides WINDOWS® terminal services.

13. The method of claim 1, wherein establishing the thin client terminal services session further comprises:
   validating the decrypted credential, wherein the thin client terminal services session is established in response to validating the decrypted credential.

14. An article comprising at least one non-transitory computer readable storage medium containing instructions that when executed cause a terminal server to:
   receive an encrypted credential from a client terminal, wherein the encrypted credential is based on encryption of an authentication credential input by a user at the client terminal for allocating resources for a thin client terminal services session at the terminal server;
   in response to receiving the encrypted credential, request a decryption key from a trust authority system;
   receive the decryption key from the trust authority system if the trust authority system confirmed that the decryption key is valid; and
   decrypt the encrypted credential using the decryption key in response to determining that the decryption key is valid.

15. The article of claim 14, wherein determining that the decryption key is valid is based on detecting that a time duration associated with the decryption key has not expired.

16. The article of claim 14, wherein the instructions when executed cause the terminal server to further:
   validate the decrypted credential; and
   establish the thin client services session in response to validating the decrypted credential.

17. The article of claim 14, wherein the instructions when executed cause the terminal server to further:

provide personalized environment information to the client terminal to enable a personalized desktop at the client terminal.

18. The article of claim 17, wherein the instructions when executed cause the terminal server to further:

store multiple instances of the personalized environment information for different users that provide different personalized desktop environments at different client terminals.

19. The article of claim 14, where the instructions when executed cause the terminal server to further:

execute a software application at the terminal server for the thin client terminal services session.

20. A server comprising:

resources for establishing terminal services sessions for client terminals, wherein the resources include software applications and personalized environment information for establishing personalized desktop environments for different users at different client terminals;

a cryptographic service provider to:

receive an encrypted credential from a first of the client terminals;

in response to receiving the encrypted credential, request a decryption key from a trust authority system;

receive the decryption key from the trust authority system if the trust authority system confirmed that the decryption key is valid;

use the decryption key to decrypt the encrypted credential in response to confirmation that the decryption key is valid; and use the decrypted credential to establish a thin client terminal services session between the first client terminal and the server.

21. The server of claim 20, further comprising:

a session allocation manager to:

receive a credential input by the user, wherein the credential input by the user is encrypted to provide the encrypted credential; and provide an address of a resource in the server in response to validating the credential, wherein the address of the server is used by the first client terminal to establish a login connection with the server to provide the encrypted credential to the server.

* * * * *

UNITED STATES PATENT AND TRADEMARK OFFICE
CERTIFICATE OF CORRECTION

| | | |
|---|---|---|
| PATENT NO. | : 8,161,154 B2 | Page 1 of 1 |
| APPLICATION NO. | : 12/241435 | |
| DATED | : April 17, 2012 | |
| INVENTOR(S) | : David Elcock | |

It is certified that error appears in the above-identified patent and that said Letters Patent is hereby corrected as shown below:

In column 1, line 3, below "SESSION" insert -- CROSS REFERENCE TO RELATED APPLICATIONS
This Application claims the benefit of provisional patent application serial number 61/005,370, filed December $4^{th}$, 2007, titled "Establishing A Thin Client Terminal Services Session" which application is incorporated by reference herein as if reproduced in full below. --.

In column 7, line 10, in Claim 19, delete "where" and insert -- wherein --, therefor.

Signed and Sealed this
Fourth Day of December, 2012

David J. Kappos
*Director of the United States Patent and Trademark Office*